United States Patent [19]

Fukunaga et al.

[11] Patent Number: 5,114,177

[45] Date of Patent: May 19, 1992

[54] ANTI-ROLLING CONTROLLING SYSTEM FOR AUTOMOTIVE ACTIVE SUSPENSION SYSTEM WITH ROAD FRICTION DEPENDENT VARIABLE CONTROL CHARACTERISTICS

[75] Inventors: Yukio Fukunaga; Naoto Fukushima; Yohsuke Akatsu; Itaru Fujimura; Masaharu Satoh, all of Kanagawa, Japan

[73] Assignee: Nissan Motor Company, Limited, Yokohama, Japan

[21] Appl. No.: 365,468

[22] Filed: Jun. 12, 1989

[30] Foreign Application Priority Data

Jun. 10, 1988 [JP] Japan .................. 63-142866

[51] Int. Cl.⁵ .............................. B60G 17/01
[52] U.S. Cl. .................... 280/707; 280/689; 364/424.05
[58] Field of Search ......... 280/707, 612, 772, DIG. 1, 280/689; 364/424.05

[56] References Cited

U.S. PATENT DOCUMENTS

| | | | |
|---|---|---|---|
| 4,650,212 | 3/1987 | Yoshimura | 280/707 |
| 4,712,807 | 12/1987 | Kurosawa | 364/424.05 |
| 4,733,878 | 3/1988 | Kanazawa | 280/91 |
| 4,761,022 | 8/1988 | Ohashi | 280/707 |
| 4,827,416 | 5/1989 | Kawagoe | 364/424.05 |
| 4,834,419 | 5/1989 | Kozaki | 280/707 |

FOREIGN PATENT DOCUMENTS

| | | |
|---|---|---|
| 236947 | 8/1987 | European Pat. Off. . |
| 249246 | 12/1987 | European Pat. Off. . |
| 2590525 | 5/1987 | France ............ 280/707 |
| 60-183214 | 9/1985 | Japan . |
| 62-295714 | 12/1987 | Japan . |

Primary Examiner—Charles A. Marmor
Assistant Examiner—Karin Tyson
Attorney, Agent, or Firm—Foley & Lardner

[57] ABSTRACT

An anti-rolling suspension control system generally derives anti-rolling control signals for controlling suspension characteristics of respective suspension systems in order to suppress vehicular rolling motion. The system is further provided means for monitoring road friction condition. The system derives distribution of rolling moment distribution ratio between front suspension systems and rear suspension systems based on the monitored road friction condition so that the derived distribution may be adapted to the road surface frictional condition.

22 Claims, 8 Drawing Sheets (a)

(b)

(a)

(b)

ANTI-ROLLING CONTROLLING SYSTEM FOR AUTOMOTIVE ACTIVE SUSPENSION SYSTEM WITH ROAD FRICTION DEPENDENT VARIABLE CONTROL CHARACTERISTICS

BACKGROUND OF THE INVENTION

1. Field of the Invention

The present invention relates generally to an active suspension system for an automotive vehicle, which is controlled in an active manner for absorbing road shock and suppressing vehicular body attitude change in order to achieve both riding comfort and driving stability. More specifically, the invention relates to an actively controlled suspension system which has variable control characteristics depending upon road friction so that driving stability on a low friction road can be enhanced.

2. Description of the Background Art

European Patent First Publication No. 0 283 004 discloses an actively controlled suspension system including an anti-roll control loop which is responsive to lateral acceleration to be exerted on a vehicle to adjust suspension characteristics. The control loop employed suspension system is variable of response characteristics to vehicular rolling depending upon the vehicle speed for varying anti-rolling suspension control characteristics. In a range of the vehicle speed in which the greater loop gain of the control loop causes significant and unacceptable levels of self-induced lateral vibration, a gain is varied to be the smaller value than that in other vehicle speed ranges. Namely, since the greater gain may cause self-induced lateral vibration in a substantially low vehicle range, the gain main be adjusted to a smaller value while vehicle speed is lower than a given value. Also, European Patent First Publication No. 0 285 153 discloses an actively controlled automotive suspension system employing a factor representative of a self-induced attitude change creative factor as a correction factor in an attitude regulating suspension control. Suspension characteristics are controlled on the basis of a rolling and/or pitching energy representing parameter. The correction factor representative of self-induced attitude change is derived on the basis of the vehicular attitude change velocity for canceling the self-induced rolling and/or pitching. By canceling the self-induced rolling and/or pitching creative component from the rolling and/or pitching acceleration factor, higher rolling and/or pitching response characteristics can be provided so as to obtain satisfactorily high driving stability and riding comfort.

On the other hand, Japanese Patent First (unexamined) Publication (Tokkai) Showa 62-295714, which is assigned to the common assignee to the present invention, discloses one typical example of a prior proposed actively controlled suspension system for performing anti-rolling and/or anti-pitching suspension controls. The disclosed system employs a lateral acceleration sensor and a longitudinal acceleration sensor for monitoring vehicular attitude change magnitude indicative parameters for performing attitude change suppressive control.

In the prior proposed anti-rolling suspension control systems, magnitude of adjusting stiffness of suspension characteristics of the suspension system is determined depending upon a lateral acceleration exerted on the vehicular body with a uniformly set control characteristic. Therefore, irrespective of the road surface condition, i.e. dry or wet, high friction or low friction, the control magnitude with respect to the magnitude of lateral acceleration is held unchanged. Therefore, distribution of rolling moment at the front and rear suspension systems is maintained constant to cause degradation of cornering ability and/or steering characteristics on a low friction road.

SUMMARY OF THE INVENTION

It is, therefore, an object of the present invention to provide an anti-rolling suspension control system which can provide enhanced cornering and steering characteristics even on a low friction load.

In order to accomplish the aforementioned and other objects, an anti-rolling suspension control system, according to the present invention, generally derives anti-rolling control signals for controlling suspension characteristics of respective suspension systems in order to suppress vehicular rolling motion. The system is further provided means for a road friction condition. The system derives distribution of rolling moment distribution ratio between front suspension systems and rear suspension systems based on the monitored road friction condition so that the derived distribution may be adapted to the road surface frictional condition.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
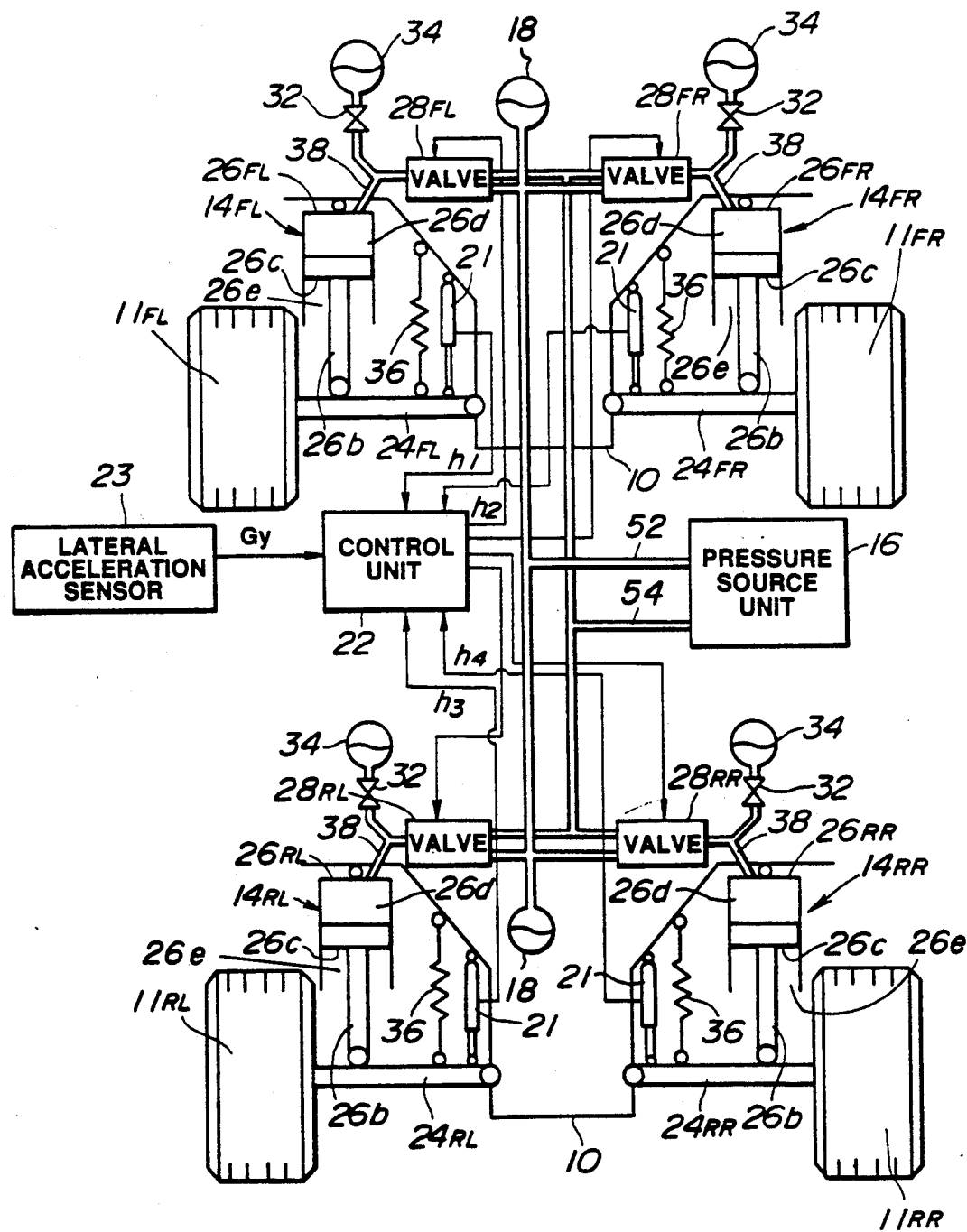
FIG. 1 is an illustration of the overall construction of the preferred embodiment of an actively controlled suspension system according to the present invention.

Referring now to the drawings, particularly to FIG. 1, the preferred embodiment of an actively controlled suspension system, according to the present invention, is designed to generally perform suspension control for suppressing relative displacement between a vehicle body 10 and suspension members 24FL, 24FR, 24RL and 24RR provided in front-left, front-right, rear-left and rear-right suspension mechanisms 14FL, 14FR, 14RL and 14RR and rotatably supporting front-left, front-right, rear-left and rear-right wheels 11FL, 11FR, 11RL and 11RR, which suspension member will be represented by the reference numeral "24" as generally referred to, and suspension mechanisms will be represented by the reference numeral "14" as generally referred to, and whereby suppressing vehicle body attitude change. Respective front-left, front-right, rear-left and rear-right suspension mechanisms 14FL, 14FR, 14RL and 14RR include hydraulic cylinders 26FL, 26FR, 26RL and 26RR, which hydraulic cylinder will be hereafter represented by the reference numeral "26" as generally referred to.

Each hydraulic cylinder 26 is disposed between the vehicle body 10 and a suspension member 24 to produce a damping force for suppressing relative displacement between the vehicle body and the suspension member. The hydraulic cylinder 26 has a cylinder body 26a. The cylinder body 26a defines a working fluid chamber therein. A piston 26c is disposed within the working fluid chamber to divide the working fluid chamber into a upper working chamber 26d and a lower reference pressure chamber 26e. The working chamber 26d and the reference pressure chamber 26e are communicated each other via an orifice defined through the piston 26c. The piston 26c is connected to associated one of the suspension members 24FL, 24FR, 24RL and 24RR via a piston rod 26b. A suspension coil spring 36 is provided in parallel to each of the hydraulic cylinder 26. The suspension coil spring 36 employed in the shown type of the suspension is not required a resilient force sufficient for damping relative displacement between the vehicle body and the associated suspension member.

The working chamber 26d of each hydraulic cylinder 26 is connected to a hydraulic pressure source unit 16 via a pressure supply line 52, a pressure drain line 54, and a pressure control valve units 28FL, 28FR, 28RL and 28RR and a pressure control line 38, which pressure control valve units will be hereafter represented by the reference numeral "28" as generally referred to, and a pressure line 38. As seen from FIGS. 1 and 2, the pressure line 38 is connected to a fluid path 26g defined through the piston rod 26b and the piston 26c. The working chamber 26d of the hydraulic cylinder 26 is further communicated with a pressure accumulator 34 via an orifice 32. Other pressure accumulators are provided in the pressure supply line 52 for accumulating the excessive pressure generated by the pressure source unit 16.

The pressure control valve unit 28 comprises a proportioning valve and is designed to be controlled by an electric control signal for varying valve position according to variation of current value of the control signal. Generally, the pressure control valve unit 28 controls magnitude of introduction and draining of the pressurized working fluid into and from the working chamber 26d for adjusting the pressure in the working chamber for setting the damping mode of the hydraulic cylinder 26. To control the valve position of the pressure control valve unit 28, a control unit 22 which comprises a microprocessor, is provided.

The control unit 22 is connected to various sensors which monitor vehicle body attitude change representative parameters to produce sensor signals. The sensors may include vehicular height sensors 21 for monitoring stroke of relative motion between the vehicle body and the suspension members 24 to produce vehicle height indicative sensor signals $h_1$, $h_2$, $h_3$, and $h_4$, and lateral acceleration sensor 23 which are designed for monitoring lateral acceleration exerted on the vehicle body to produce lateral acceleration indicative signals. As will be understood from the discussion given later, the lateral acceleration sensor 23 is longitudinally oriented at a position shifted frontwardly. While the shown embodiment employs the vehicle height sensor as the vehicular attitude change indicative parameter, the similar vehicular height indicative parameter can be monitored by a vertical acceleration sensor which monitors vertical acceleration exerted to the vehicle body, to produce vertical acceleration indicative signal for bouncing control for suppressing bounding and rebounding motion of the vehicle body. In addition, a longitudinal acceleration sensor for monitoring longitudinal acceleration exerted on the vehicle body as vehicular pitching representative parameter may be employed for anti-pitching and anti-rolling control. Furthermore, other sensors, such as a vehicular speed sensor, steering angle sensor and so forth which monitor vehicular driving condition affecting vehicular attitude may also be employed for performing various suspension control.

Figure 2:
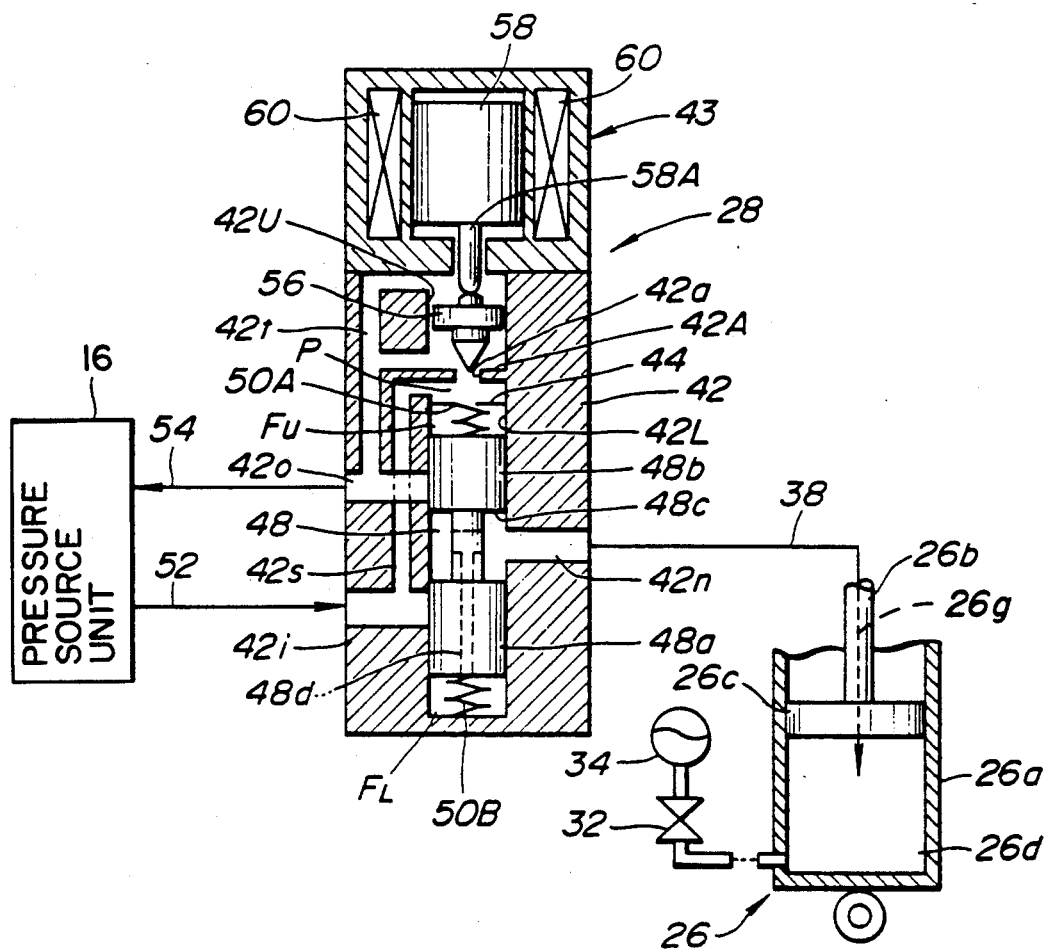
FIG. 2 is a sectional view of a pressure control valve employed in the preferred embodiment of the actively controlled suspension system of FIG. 1.

FIG. 2 shows the detailed construction of the pressure control valve unit 28 to be employed in the shown embodiment of the actively controlled suspension system set forth above.

The pressure control valve 28 comprises a valve houses 42 which housing a proportioning solenoid 43. The proportioning solenoid 43 is electrically connected to the control unit 22. The valve housing 42 defines a valve bore which is separated into a valve chamber 42L and a control chamber 42U by means of a partitioning member 42A. The partitioning member 42A is formed with a communication hole 42a. Above the communication hole 42a is defined the control chamber 42U. The valve chamber 42L and the control chamber 42U are aligned to each other across the communication hole 42a. Beneath the communication hole 42a and adjacent the top of the valve chamber 42L, a stationary throttling orifice defining member 44 is provided. The throttling orifice defining member 44 is formed with a fixed throttling rate of orifice. The throttling orifice defining member 44 defines with the partitioning member 42A a pilot chamber P.

A valve spool 48 is thrustingly or slidingly disposed within the valve chamber 42L. The valve spool 48 defines an upper feedback chamber FU between the top end thereof and the throttling orifice defining member 44. The valve spool 48 also defines a lower feedback chamber FL between the lower end thereof and the bottom of the valve chamber 42L. Offset springs 50A and 50B are disposed within the upper and lower feedback chambers FU and FL, which offset springs exerts spring force to the valve spool 48 for resiliently restricting movement of the latter. The valve chamber 42L is communicated with an inlet port 42i, a drain port 42o and the communication port 42n which are defined through the valve housing 42. The inlet port 42i is connected to the pressure unit 16 via a supply line 52. On the other hand, the drain port 42o is connected to the pressure unit 16 via the drain line 54.

The valve spool 48 is formed with an upper land 48b and a lower land 48a. The upper and lower lands 48b and 48a defines therebetween an annular pressure chamber 48c. The valve spool 48 is formed with a pilot path 48d communicating the pressure chamber 48c with the lower feedback chamber FL.

A poppet valve member 56 is disposed within the control chamber 42U for thrusting or sliding movement therein. The poppet valve member 56 has a valve head opposing to the communication hole 42a. The poppet valve member 56 is operably associated with the proportioning solenoid 43 which comprises a plunger 58 which has a plunger rod 58A. The lower end of the plunger rod 58A of the plunger 58 opposes to the top end of the poppet valve 56. The poppet valve member 56 is driven by the plunger 58 to control the path area in the communication hole 42a according to the position of the plunger rod 58A. Therefore, the poppet valve member 56 adjusts the path area of the communication hole 42a and whereby to control fluid pressure to be introduced in the pilot chamber P. poppet valve member 56 separates the control chamber 42U into upper and lower control chambers. In order to control the position of the poppet valve 56 for adjusting the pilot pressure in the pilot chamber P, a solenoid coil 60 is provided for energizing or deenergizing to cause axial shift of the plunger rod 58A.

By adjusting the fluid pressure in the pilot chamber P, the pressure in the upper feedback chamber FU is adjusted to exert an axially driving force to the valve spool 48 to cause axial shift. By this, selective fluid communication between the inlet port 42i, the drain port 42o and the communication port 42n can be established to adjust the fluid pressure at the communication port 42n. Since the pressure at the communication port 42n is equal to the fluid pressure in the working chamber 26d of the pressure cylinder 26, the damping force created by the pressure cylinder can be adjusted. The inlet port 42i is also connected to the pilot chamber p via a fluid path 42s. On the other hand, the drain port 42o is connected to control chamber 42U via a fluid path 42t.

In order to control the pressure at the communication port 42n, a control current I is applied to the solenoid coil 60.

Figure 3:
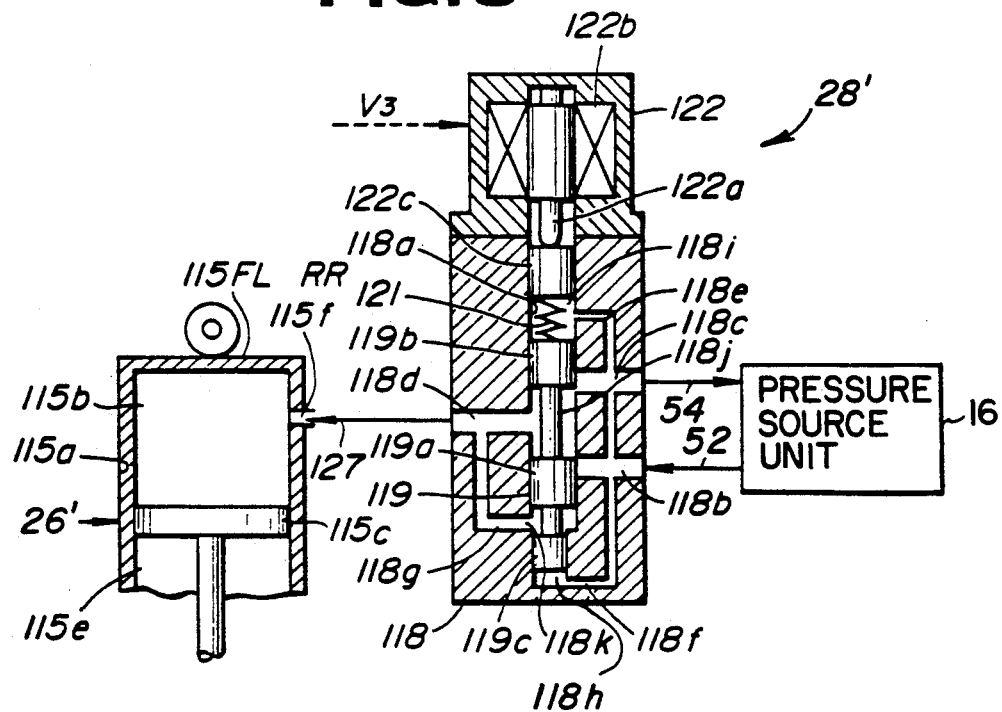
FIG. 3 is another embodiment of the pressure control valve to be employed in the preferred embodiment of the actively controlled suspension system of FIG. 1

FIG. 3 shows alternative embodiment 28' of the pressure control valve unit 28 to be employed in the preferred embodiment of the actively controlled suspension system, according to the invention as well as the altenate embodiment 26' of the hydraulic cylinder 26.

As will be seen from FIG. 3, the hydraulic cylinder 26' includes hollow cylinder housing 115a formed with a port 115f communicating the upper fluid chamber 115b to an outlet port 118d of the pressure control valve 28' of pressure control valve insert 28' via a communication line 127. Though FIG. 3 does not show clear construction, the lower fluid chamber 115e is defined as an enclosed space and is filled with the viscous working fluid. The pressure of the working fluid in the lower fluid chamber 115e at an initial position of the piston 115c serves as a reference pressure and per se serves as resistance for downward movement of the piston.

The pressure control valve 28' has a valve housing 118 having the aforementioned outlet port 118d, an inlet port 118b and a drain port 118c. Respective inlet port 118b, the drain port 118c and the outlet port 118d are connected to a valve bore 118a defined within the valve housing 118. A valve spool 119 is disposed within the valve bore 118a for thrusting movement therein. The valve spool 119 has first, second and third lands 119a, 119b and 119c. As will be seen from FIG. 3, the third land 119c has smaller diameter than that of the first and second lands 119a and 119b. The third land 119c defines a fifth pressure control chamber 118h which is connected to the drain port 118c via a drain path 118f. An actuator piston 122c is also disposed within the valve bore 118a. The actuator piston 122c opposes the second land 119b in spaced apart relationship to define a second pressure control chamber 118i which is connected to the drain port 118c via a drain path 118e. An annular pressure chamber 118j is defined between the first and second lands 119a and 119b. The pressure chamber 118j is constantly communicated with the outlet port 118d and whereby communicated with the upper fluid chamber 115b. On the other hand, the pressure chamber 118j shifts according to shifting of the valve spool 119 to selectively communicate the outlet port 118d with either the inlet port 118b or the drain port 118c. On the other hand, an pressure control chamber 118k is defined between the first and third lands 119a and 119c. The pressure control chamber 118k is in communication with the outlet port 118d via a pilot path 118g. A bias spring 121 is interposed between the actuator piston 122c and the valve spool 119. The actuator piston 122c contacts with an actuator rod 122a of an electrically operable actuator 122 which comprises an electromagnetic solenoid. The solenoid 122 comprises a proportioning solenoid.

In order to increase the supply pressure of the working fluid, the spool valve 119 is shifted to the lower position to increase path area at a throttle constituted at the inner end of the inlet port 118b by means of the land 119a of the spool valve 119. On the other hand, in order to decrease the supply pressure of the working fluid, the spool valve is shifted to the lower position to decrease the path area at the throttle of the inner end of the inlet port 118b and opens the drain port 118c which is normally blocked by means of the land 119b of the spool valve.

As seen from FIG. 3, the proportioning solenoid 122 comprises the actuator rod 122a and a solenoid coil 122b. The solenoid coil 122b is energized by suspension control signal from the control unit. In the shown embodiment of the pressure control valve, the working fluid pressure P at the outlet port 118d is variable according to the predetermined variation characteristics. Namely, when the control value represented by the suspension control signal is zero, the pressure at the outlet port 118d becomes an initial pressure determined according to a predetermined offset pressure. When the suspension control signal value in positive value increases, the fluid pressure at the outlet port 118d increases with a predetermined proportioning rate. Namely, by increasing of the suspension control value, the actuator rod 122a is driven downwardly in FIG. 3 at a magnitude toward to position to achieve increasing of the fluid pressure with the predetermined proportioning rate. The fluid pressure at the outlet port 118d saturate at the output pressure of the pressure unit. On the other hand, when the suspension control signal value decreases, the pressure decreases to zero to by shifting of the actuator rod 122a.

The actuator rod 122a of the proportioning solenoid 122 is associated with the actuator piston 122c. Contact between the actuation rod 122a and the actuator piston 122c can be maintained by the resilient force of the bias spring 121 which normally biases the actuator piston toward the actuation rod. On the other hand, the spring force of the bias spring 121 is also exerted on the valve spool 119 to constantly bias the valve spool downwardly in FIG. 3. The valve spool 119 also receives upward hydraulic force from the pressure control chamber 118k. Therefore, the valve spool 119 is oriented at the position in the valve bore at the position where the downward bias of the bias spring 122d balances with the upward hydraulic force of the pressure control chamber 118k.

Figure 4:
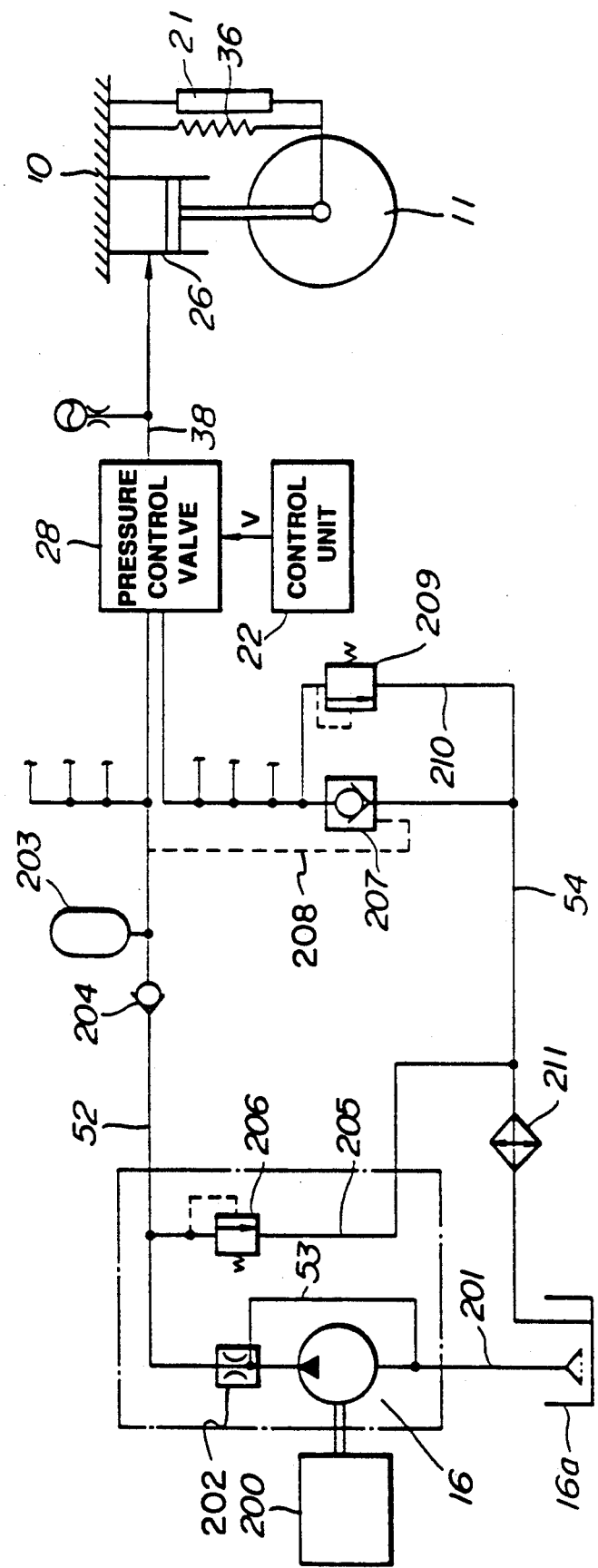
FIG. 4 is a circuit diagram of a hydraulic circuit to be employed in the preferred embodiment of the actively controlled suspension system according to the present invention.

FIG. 4 is a circuit diagram of a hydraulic circuit including the pressure source unit 16 and the working fluid chamber 26d of the hydraulic cylinder 26.

FIG. 4 shows detailed circuit construction of the preferred embodiment of the hydraulic system to be employed in the suspension control system according to the invention. Although it is not shown in detail for the purpose of simplification of the disclosure, input terminals of the control unit 22 are connected to previously noted sensors, namely the vehicular height sensors 21 and the lateral acceleration sensor 23, and output terminals of the control unit 22 are connected to the pressure control valves 28. As set forth, the pressure source unit includes the pressure unit 16 which comprises a fluid pump, and is connected to the reservoir 16a via a suction pipe 201 which is driven by means of an automotive engine 200. The outlet of the pressure unit 16, through which the pressurized working fluid is fed, is connected to the inlet port 42i of the pressure control valve 18 via the supply line 52. A pressure regulating orifice 202 is disposed in the supply line 52 for suppressing pulsatile flow of the working fluid and whereby regulate the output pressure of the pressure unit 16 to be delivered to the pressure control valve 28. A feedback line 53 is connected to the upstream of the pressure regulating orifice 202 at one end. The other end of the feedback line 53 is connected to the upstream of the inlet of the pressure unit 16. Therefore, excessive fluid between the pressure unit 16 and the orifice 202 is fed back to the inlet side of the pressure unit.

A pressure accumulator 203 is also connected to the supply line 52 to receive therefrom the pressurized fluid for accumulating the pressure. A one-way check valve 204 is disposed in the supply line 52 at the position upstream of the junction between the pressure accumulator 203 and the supply line 52.

A pressure relief line 205 is also connected to the supply line 52 at the position intermediate between the pressure regulating orifice 202 and the one-way check valve 204, at one end. The other end of the pressure relief line 205 is connected to the drain line 54. A pressure relief valve 206 is disposed in the pressure relief line 205. The pressure relief valve 206 is responsive to the fluid pressure in the supply line 52 higher than a give value to drain part of the working fluid to the drain line for maintaining the pressure in the supply line 52 below the given pressure value.

On the other hand, a shut-off valve 207 is disposed in the drain line 54. The shut-off valve 207 is also connected to the supply line 52 at upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 54 may flow therethrough to the reservoir tank 16a. On the other hand, the shut-off valve 207 is responsive to the pilot pressure drops below the given pressure level to be switched into shut-off position. At the shut-off position, the shut-off valve blocks fluid communication between the drain port 42o and the reservoir tank 16a.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 54 upstream thereof, higher than a set pressure, e.g. 30 kgf/cm$^2$, in order to establish fluid communication between the upstream side and downstream side of the shut-off valve to allow the excessive pressure at the upstream side drain line 54 to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 54 for cooling the working fluid returning to the reservoir tank 16a.

Pressurized fluid supply operation to be taken place by the pressure source unit as set forth above will be discussed herebelow.

While the automotive engine 200 is running, the fluid pump as the pressure unit 16 is driven. Therefore, the working fluid in the reservoir tank 16a is sucked via the suction pipe 201 and pressurized through the pressure unit 16. The pressurized working fluid is discharged from the outlet of the pressure unit 16 and fed to the pressure control valve 28 via the supply line 54 including the pressure regulating orifice 202 and the one-way check valve 204. When the pressure control valve 28 in the lower position of FIG. 2, the pressurized working fluid passes the pressure control valve and introduced into the working chamber 26d of the hydraulic cylinder 26. On the other hand, when the pressure control valve 28 is shifted to block communication between the supply line 52 and the working chamber 26d, the line pressure in the supply line increases. When the line pressure in the supply line 52 becomes higher than a set pressure of the pressure relief valve 206 in the pressure relief line 205, the excessive pressure higher than the set pressure is fed to the drain line 54 via the pressure relief valve 206 and thus returned to the reservoir tank 16a.

The fluid pressure in the supply line 52 is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 54 via the shut-off valve 207 and the oil cooler 211.

Since the shut-off valve 207, even at the open position, serves as a resistance to the fluid flow. Therefore, the fluid pressure in the drain line 54 upstream of the shut-off valve 207 becomes excessively higher, i.e. higher than the off-set pressure $P_O$. Then, the pressure relief valve 209 becomes active to open for allowing the excessive pressure of the working fluid to flow through the by-pass line 210.

When the engine 200 stops, the pressure unit 16 cease opeation. By stopping of the pressure unit 16, the working fluid pressure in the supply line 52 drops. According to drop of the pressure in the supply line 52, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 54 upstream of the shut-off valve 207 becomes equal to the pressure in the working chamber 26d. Therefore, even when the working fluid leaks through a gap between the spool valve 48 and the inner periphery of the valve bore, it will not affect the fluid pressure in the working chamber 26d.

This is advantageous to maintain the suspension characteristics of the suspension systems irrespective of the engine driving condition.

Figure 5:
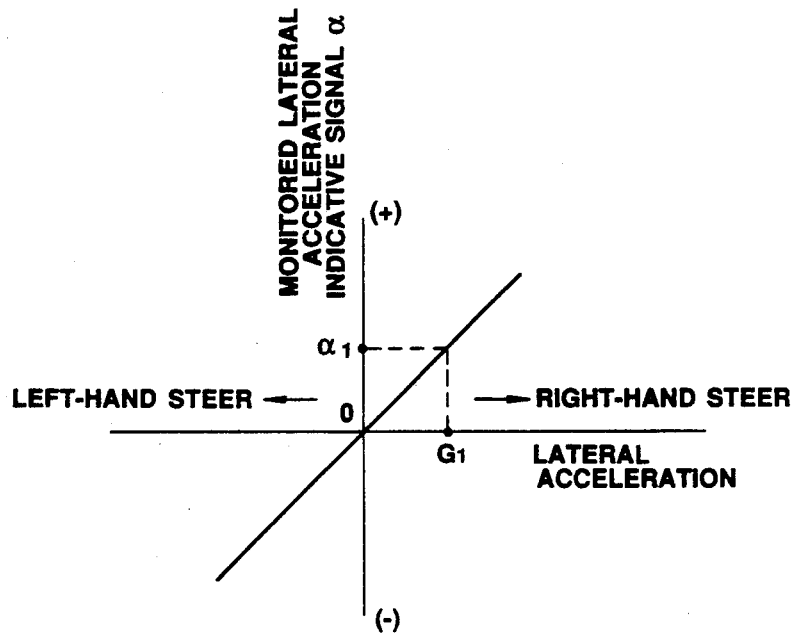
FIG. 5 is a chart showing relationship between lateral acceleration caused by steering operation and output signal values of the lateral acceleration sensors.

FIG. 5 shows variation of the lateral acceleration indicative signal value Ga generated by the lateral acceleration sensor 23. In the shown embodiment, the lateral acceleration indicative signal value Ga increases according to increasing of right-hand steering and decreases according to increasing of left-hand steering. For example, assuming lateral acceleration $G_1$ is generated in response to a certain magnitude of right-hand steering, the lateral acceleration sensor 23 produces a positive value of lateral acceleration indicative signal $Ga_1$. As can be seen from FIG. 5, when the left-hand steering is made, the lateral acceleration indicative signal value generated by the lateral acceleration sensor 23, becomes negative value.

Figure 6:
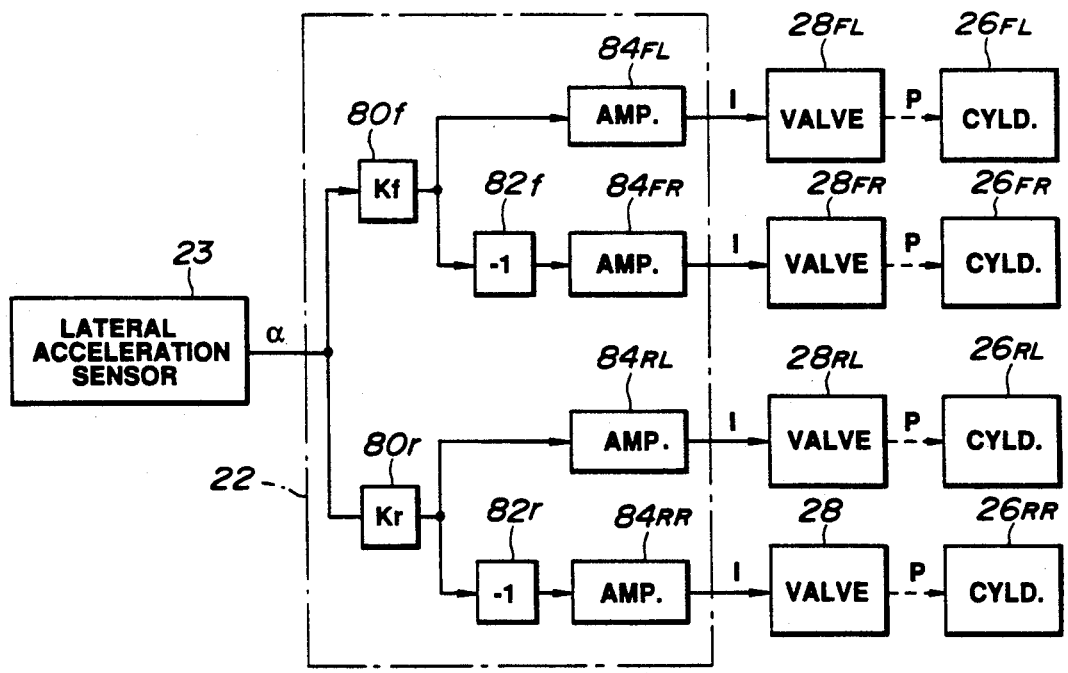
FIG. 6 is a schematic and illustrative block diagram of a control circuit to be employed in the preferred embodiment of the actively controlled suspension system according to the invention.

FIG. 6 shows a imaginary or theoretical block diagram of the control circuit for performing active suspension control based on rolling magnitude as indicated by, for example, lateral acceleration sensor 23 in accordance with the present invention. As can seen from FIG. 6, the lateral acceleration sensor 23 is connected to the control unit 22 for providing the rolling magnitude indicative signal in the form of a lateral acceleration signal Ga. The control unit 22 performs anti-rolling suspension control principally based on the lateral acceleration indicative signal Ga received from the lateral acceleration sensor 23. The control unit 22 includes a gain circuit 80f for amplifying the lateral acceleration indicative signal by a predetermined gain KP. The gain circuit 80f is connected to the front-left pressure control valve unit 28FL via an amplifier 84FL and connected to the front-right pressure control valve unit 28FR via an inverter 82f and an amplifier 84FR. Also, the control unit includes a gain circuit 80r for amplifying the lateral acceleration indicative signal of the lateral acceleration sensor 23 by a predetermined gain Kr. The gain circuit 80r is connected to the rear-left pressure control valve 28RL via an amplifier 84RL and connected to the rear-right pressure control valve unit 28RR via an inverter 82r and an amplifier 84RR.

Figure 7:
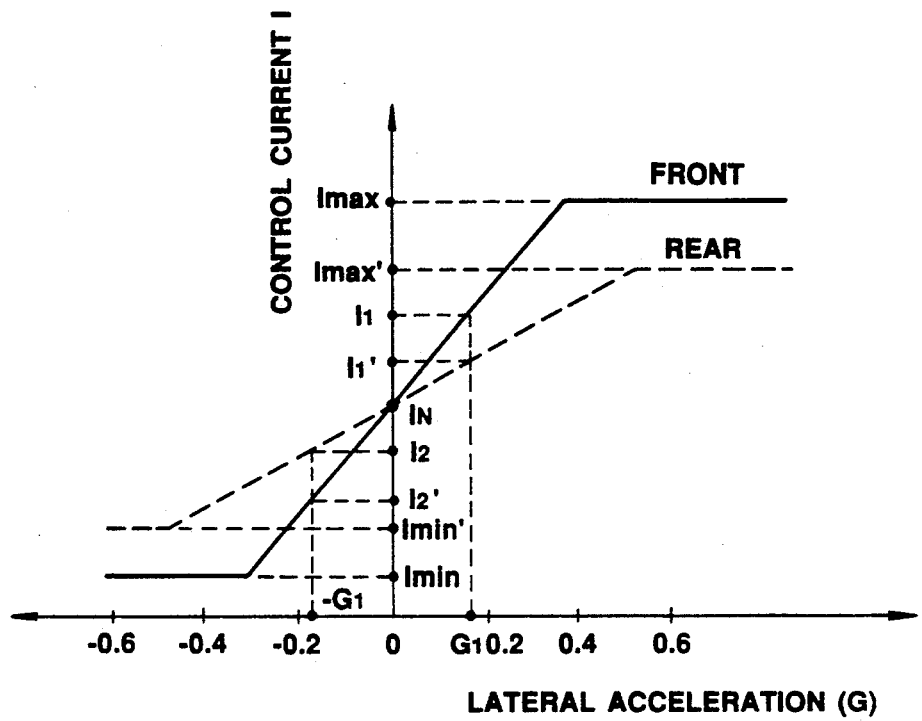
FIG. 7 is a chart showing relationship between an electric current value of a control signal to be output by a control unit and the lateral acceleration exerted on the vehicle body.

As seen from FIG. 6, the control unit 22 receives the lateral acceleration indicative signal Ga from the lateral acceleration sensor 23. The gain circuit 80f and 80r may comprise a gain controlled amplifier which may be variable of the amplifier gains by electic voltage externally exerted. Furthermore, the amplifiers 84FL and 84FR for the front-left and front-right suspension systems have fixed gain Kf' greater than the fixed gain Kr' of the amplifiers 84RL and 84RR for the rear-left and rear-right suspension systems, as shown in FIG. 7. Therefore, the variation gradient of the control signals I for the pressure control valve units 28FL and 28FR of the front-left and front-right suspension systems becomes greater than that for the pressure control valve units 28RL and 28RR of the rear-left and the rear-right suspension systems. Furthermore, in the shown embodiment, the minimum and maximum current values $I_{max}$ and $I_{min}$ for the front-left and front-right pressure control valve units 28FL and 28FR are set at greater values than that $I_{max}'$ and $I_{min}'$ for the rear-left and the rear-right pressure control valve units 28RL and 28RR. Such difference of the maximum and minimum control current values $I_{max}$, $I_{max}'$, $I_{min}$ and $I_{min}'$ may provide difference of variation range of stiffness of the hydraulic cylinders in front and rear suspension systems. Namely, the stiffness of the rear hydraulic cylinders 26RL and 26RR varies in a narrower range than the front hydraulic cylinders 26FL and 26FR. Therefore, lateral slip may occur at the front suspension systems at earlier timing than that at the rear suspension systems. This makes the driver to easily realize critical lateral acceleration exerted on the vehicle body.

Figure 8:
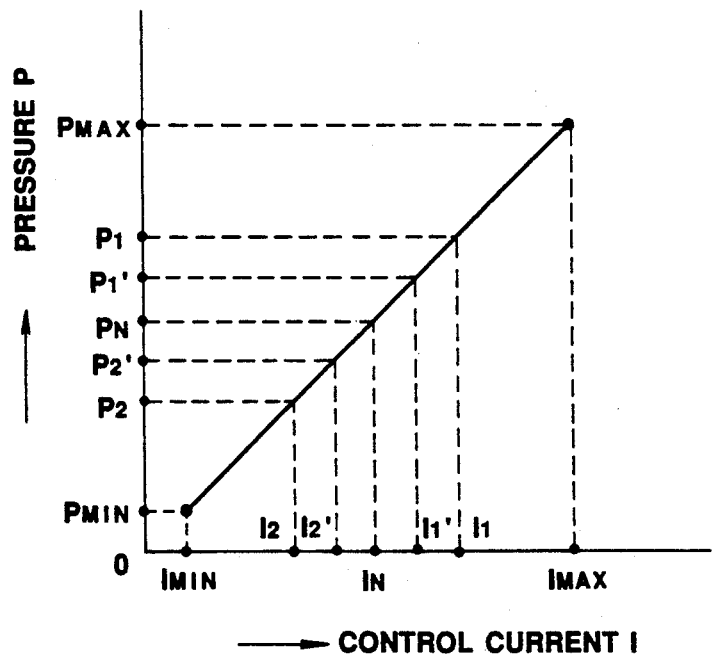
FIG. 8 is a chart showing relationship between an electric current value of a control signal to be output by a control unit and a hydraulic pressure in a pressure chamber of a hydraulic cylinder.

As seen from FIG. 8, the working fluid pressure in the working chamber 26d of the hydraulic cylinder 26 varies according to variation of the current value of the control signal applied to the pressure control valve unit 28. As seen from FIG. 8, hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 8, the maximum hydraulic pressure $P_{max}$ corresponds to the maximum current value $I_{max}$ of the control signal and the minimum hydraulic pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current value $I_n$ is set at an intermediate value between the maximum current value $I_{max}$ and the minimum current value $I_{min}$.

As seen from FIGS. 7 and 8, the control currents $I_1$, $I_1'$, $I_2$ and $I_2'$ varies across the neutral current $I_n$ depending upon the lateral acceleration indicative signal value Ga of the lateral acceleration sensor 23 generated by the corresponding magnitude of lateral acceleration. As can be seen from FIGS. 7 and 8, the control currents $I_1$ and $I_2$ for the front pressure control valve units 28FL and 28FR varies at greater magnitude from the neutral current $I_n$ than that $I_1'$ and $I_2'$ for the rear pressure control valve unit 28RL and 28RR in response to the same magnitude of lateral acceleration.

Here, it is to be noted that the magnitude of lateral acceleration to be exerted on the vehicular body is variable depending upon the road friction. Namely, the lateral acceleration magnitude is smaller at the low friction road than that in the high friction road. Therefore, by monitoring the lateral acceleration indicative signal value Ga, the road friction level can be assumed. The shown embodiment utilizes the lateral acceleration indicative parameter not only as lateral acceleration indicative data but also as the road friction indicative data. Therefore, the outputs of the amplifiers 84FL, 84FR, 84RL and, 84RR may be proportional to the lateral acceleration indicative signal value Ga as the road friction indicative factor.

In the practical operation, when the vehicle travels in straight on the smooth road, the control current I is maintained at the neutral current $I_n$. By maintaining the control current at the neutral current $I_n$, the working fluid pressure in the working chambers 26d of respective of the hydraulic cylinders 26FL, 26FR, 26RL and 26RR is maintained at neutral pressure $P_N$. Therefore, the suspension characteristics is maintained at neutral condition.

Assuming a certain magnitude of right-hand steering is made at this condition, lateral acceleration toward left is exerted due to centrifugal force for causing left-hand rolling to lower than left side of the vehicle body and lift the right side of the vehicle body. Because of right-hand steering to generate the lateral acceleration, the lateral acceleration indicative signal Ga generated by the lateral acceleration sensor 23 becomes positive value $Ga_1$ as shown in FIG. 5. Therefore, the outputs of respective amplifiers 84FL, 84RL for the left side pressure control valve units 28FL and 28RL become respectively $I_1$ and $I_1'$, both of which are greater than the neutral current $I_n$. On the other hand, the outputs of respective amplifiers 84FR and 84RR for the right side pressure control value units 28FR and 28RR become respective $I_2$ and $I_2'$, both of which are smaller than the neutral current $I_n$. As a results, the fluid pressure $P_1$ and $P_1'$ in the working chambers 26d of the front-left and rear-left hydraulic cylinders 26FL and 26RL are increased to harden the suspension characteristics and the fluid pressure $P_2$ and $P_2'$ in the working chambers 26d of the front-right and rear-right hydraulic cylinders 26FR and 26RR are decreased to soften the suspension characteristics. By this, left-hand rolling of the vehicle body is successfully suppressed.

When the turning of the vehicle is made on the low friction road, such as icy road or snow road, since the lateral force to be generated by steering operation becomes smaller than that on the high friction road, such as dry road, the output values of the amplifiers 84FL, 84FR, 84RL and 84RR becomes smaller. Thus, fluid moment for suppressing rolling, which fluid force may be referred to as rolling moment becomes smaller. Particularly, due to smaller gain Kr provided for the rear amplifiers 84RL and 84RR as set forth above, the rolling moment in the rear suspension systems becomes smaller than generated in the front suspension systems. As a result, magnitude of shifting of the load at the rear suspension systems becomes smaller than that in the front suspension systems for stability of cornering.

Figure 9:
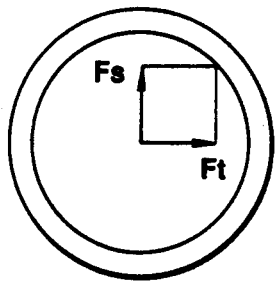
FIGS. 9(a) and (b) are chart showing variation of motion force relative to road friction.
Figure 9:
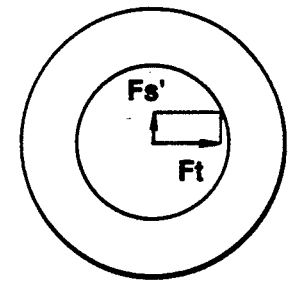

This may be clear from illustration of the lateral force Fs and the driving force or braking force Ft to be exerted on the road wheels as shown in FIGS. 9(a) and 9(b). In FIGS. 9(a) and 9(b), FIG. 9(a) shows relationship between the lateral force Fs and the force Ft at the high friction road and FIG. 9(b) shows relationship between the lateral force and the torque on the low friction road. As can be seen from these, the friction circle becomes smaller as decreasing the magnitude of shifting of the load. Therefore, by reducing lateral shifting magnitude of the load at the rear suspension systems, greater cornering stability can be obtained.

Figure 10:
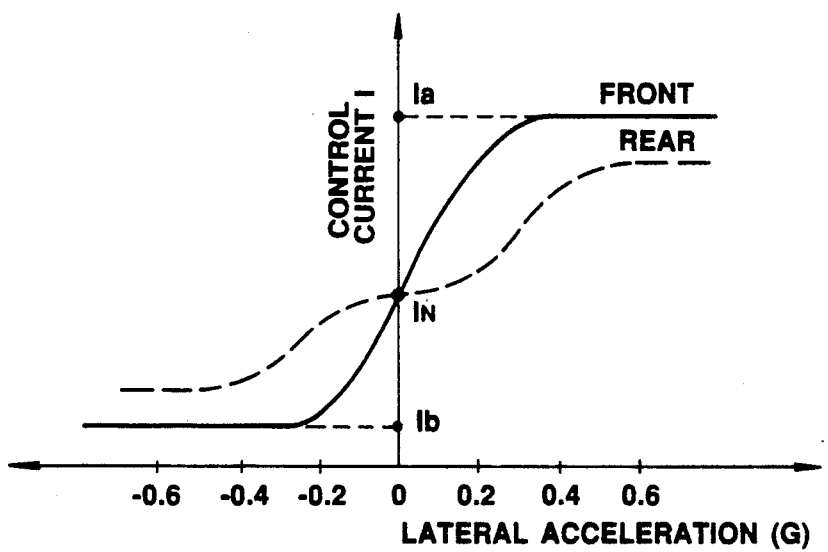
FIGS. 10(a) and 10(b) are chart showing variation of electric current value of the control signal to be output by the control unit relative to the lateral acceleration and road friction.
Figure 10:
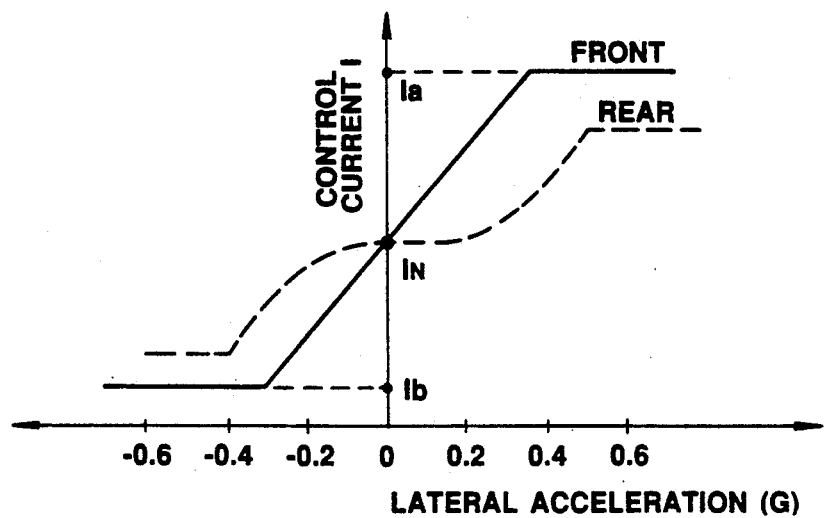
Figure 11:
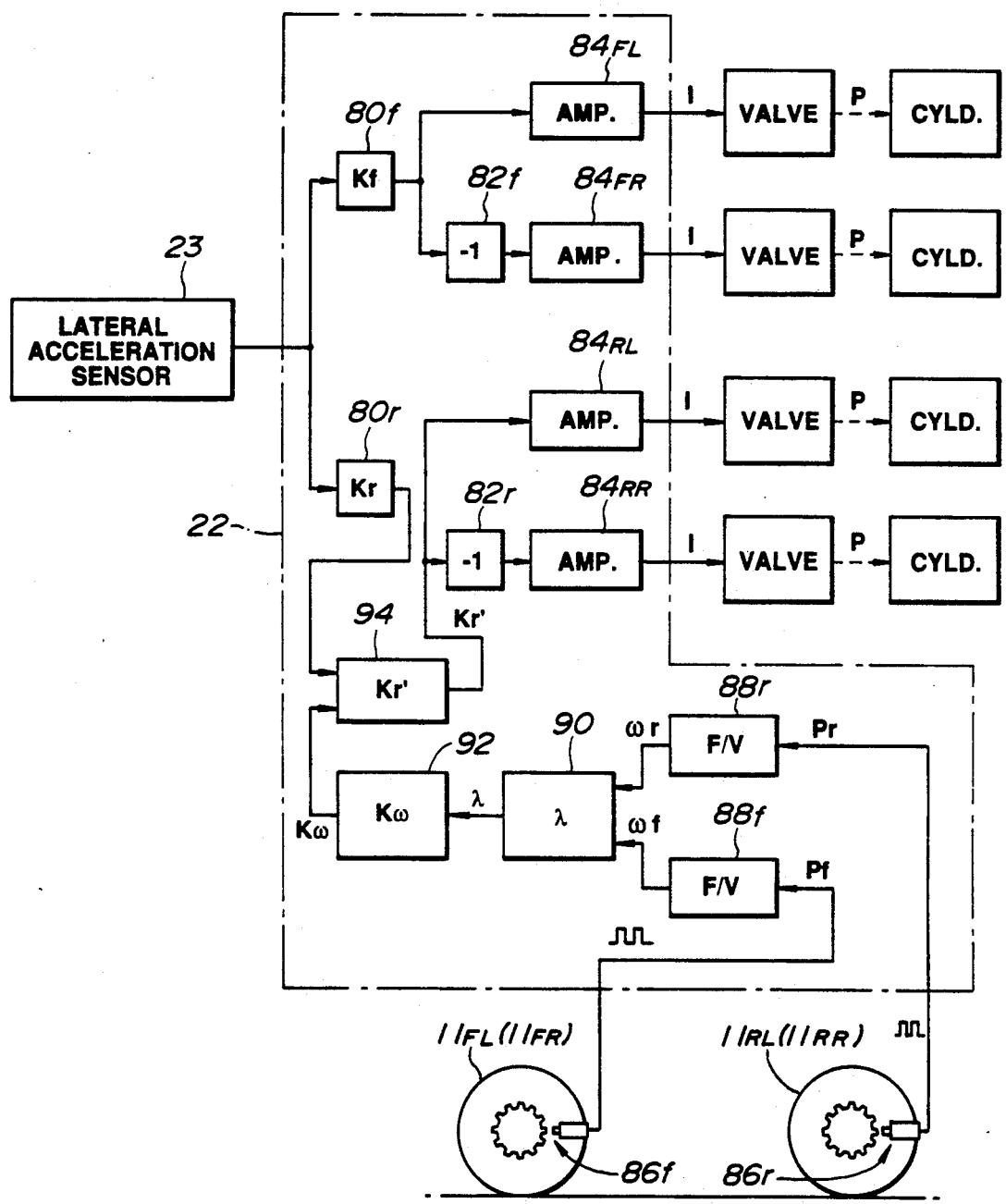
FIG. 11 is a block diagram of the second embodiment of a control unit of the actively controlled suspension system according to the present invention, which control unit implements anti-rolling control according to the invention.

Though the shown embodiment employs the linear characteristics in varying the control current I relative to the lateral acceleration Ga as shown in FIG. 7, it may be possible to employ the non-linear characteristics as shown in FIGS. 10(a) and 10(b). In both case, the rate of increasing of the control current for the rear pressure control valve units 28RL and 28RR is maintained substantially small in a range close to the neutral current $I_n$. Therefore, at the small value range of the lateral acceleration Ga, the roll moment of the rear suspension systems are maintained substantially small so that to further increase stability of cornering. FIG. 11 shows another embodiment of the anti-rolling control circuit to be employed in the preferred embodiment of the activally controlled suspension system according to the present invention. In the shown embodiment, the components the same as or equivalent to the former embodiment will be represented by the same reference numerals and neglected the detailed description so as to simplify the disclosure and avoid redundant discussion which may lead confusion.

As can be seen from FIG. 11, the shown embodiment includes wheel speed sensors 86f and 86r respectively associated one of front-left and front-right wheels 11FL and 11FR and one of rear-left and rear-right wheels 11RL and 11RR to produce front and rear wheel speed indicative signals. As seen from FIG. 11, each of the wheel speed sensors 86f and 86r comprises a notched wheel rotatable with the associated wheel and an optical or electromagnetic pick-up for detecting each notch. Therefore, the output of the wheel speed sensor 86f and 86r is in a form of periodic pulse signal. The pulse form wheel speed indicative signals of the wheel speed sensors 86f and 86r are fed to frequency-to-voltage (F/V) converter circuits 88f and 88r which are designed for converting the pulse frequencies of the wheel speed indicative signals into voltage signals having voltage levels corresponding to the frequency of the pulses and whereby represent rotation speed of the front and rear wheels. Therefore, the F/V converters 88f and 88r outputs wheel speed representative voltage signals $\omega_f$ and $\omega_r$.

The F/V converter circuits 88f and 88r are connected to a divider circuit 90 to feed the wheel speed representative voltage signal $\omega_f$ and $\omega_r$. The divider circuit 90 divides the wheel speed representative voltage signal $\omega_f$ by the value of the wheel speed representative voltage signal $\omega_r$ to derive a wheel slippage indicative data $\lambda$. Because one of the front and rear wheels is a driven wheel to be mechanically connected to an automotive engine to be driven by the output torque of the engine and the other is designed for free ratio, the wheel speed of the freely rotating wheel may be regarded as vehicular body speed representative data. When there is no wheel slippage, the ratio $\lambda$ derived in the divider circuit 90 should become one (1). When the ratio $\lambda$ is other than one, it represents that wheel slippage is occurring. Therefore, the ratio derived by the divider circuit 90 serves as the wheel slippage indicative data λ. In the particular embodiment, the system is adapted to a vehicle having a rear wheel drive power train layout. Therefore, when wheel slippage occurs, the rear wheel as driven wheel rotates at higher speed than that of the front wheel as the non-driven wheel. Upon wheel slippage occurs, the wheel slippage indicative data λ thus becomes smaller than one (1).

Figure 12:
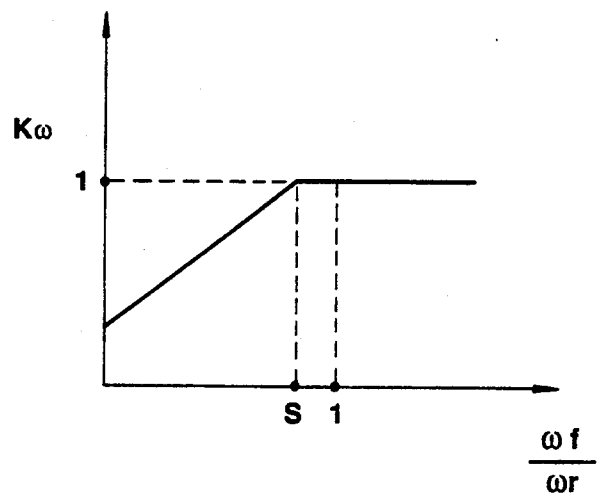
FIG. 12 is a graph showing variation characteristics of a road friction dependent coefficient in relation to ratio of front and rear wheel angular accelerations.

The wheel slippage indicative data λ is fed to a coefficient generator circuit 92. The coefficient generator circuit 92 derives a friction dependent coefficient $K_\omega$ on the basis of the wheel slippage indicative data λ according to a characteristics as shown in FIG. 12. As can be seen from FIG. 12, the friction dependent coefficient $K_\omega$ varies within a range of a predetermined minimum value which is smaller than zero and one (1) in linear fashion according to variation of the wheel slippage indicative data λ. The friction dependent coefficient $K_\omega$ is fed to a multiplier circuit 94. The multiplier circuit 92 also receives the output (Ga+Kr) of the gain circuit 80r. The multiplier circuit 94 multiplies the output of the gain circuit 80r by the friction dependent coefficient $K_\omega$ to derive a friction dependent amplified value Kr'. The friction dependent amplified value Kr' is used as the amplified value to be input to the amplifiers 84RL and 84RR directly and via the inverter 82r.

Figure 13:
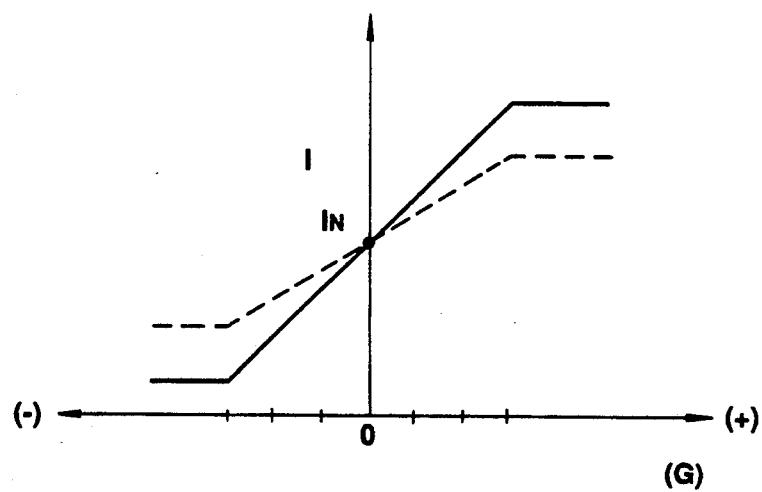
FIG. 13 is a chart showing relationship between the electric current value of the control signal and the lateral acceleration exerted on the vehicle body.

In the shown embodiment, the amplifier 84RL and 84RR may be provided amplifier gain equal to that of the amplifiers 84FL and 84FR. By modifying the value of the output of the gain circuit 80r utilizing the friction dependent coefficient $K_\omega$ as set forth above, the control current I varying according to the characteristics shown in FIG. 13 can be obtained, which characteristics is equivalent to that of the foregoing embodiment.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiments formulate control circuit by analog circuit, it is of course possible to facilitate the equivalent operation in the computer or microprocessor based control system. Also, the technology herein illustrated will be applicable for the prior proposed anti-rolling suspension control system as illustrated in the European Patent First Publications 0 283 004 and 0 285 153 set forth above, inventions illustrated in which are commonly assigned to the assignee of the present invention. Therefore, the disclosure of these European Patent First Publications will be herein incorporated by reference for the sake of disclosure.

What is claimed is:

1. An anti-rolling control system for an automotive suspension system comprising:
 a front suspension system disposed between a vehicular body and a suspension member rotatably supporting a front wheel, said front suspension system defining a working chamber filled with a working fluid having a variable fluid pressure within said working chamber for adjusting suspension characteristics;
 a rear suspension system disposed between a vehicular body and a suspension member rotatably supporting a rear wheel, said suspension system defining a working chamber filled with a working fluid having a variable fluid pressure within said working chamber for adjusting suspension characteristics;
 first pressure control valve means associated with said working chamber of said front suspension system for controlling introduction and draining of working fluid into and from said working chamber for adjusting the fluid pressure therein;
 second pressure control valve means associated with said working chamber of said rear suspension system for controlling introduction and draining of working fluid into and from said working chamber for adjusting the fluid pressure therein;
 means for monitoring vehicular rolling magnitude for producing a rolling magnitude indicative signal;
 means for deriving first and second control signals on the basis of said rolling magnitude indicative signal in order to control said first and second pressure control valve means for suppressing vehicular rolling, said control signal deriving means deriving said second control signal in such a manner that a smaller lateral load shift is provided at the rear suspension system than at said front suspension system, said control signal deriving means providing the second control signal variation characteristics for varying said control signal at a smaller rate than said first control signal when said road friction representative data indicates a low road friction condition; and means for detecting a road friction representative factor for producing road friction representative data, and said control signal deriving means being responsive to said road friction representative data for varying variation characteristics of said second control signal depending on the value of said road friction representative data.

2. An anti-rolling suspension control system as set forth in claim 1, wherein said rolling magnitude monitoring means comprises a lateral acceleration sensor.

3. An anti-rolling suspension control system as set forth in claim 2, wherein said road friction detecting means comprises said lateral acceleration sensor.

4. An anti-rolling suspension control system as set forth in claim 3, wherein said control signal deriving means includes a first amplifier for amplifying said rolling magnitude indicative signal with a first gain and a second amplifier for amplifying said rolling magnitude indicative signal with a second gain which is smaller than said first gain.

5. An anti-rolling suspension control system as set forth in claim 4, wherein said second amplifier has said second gain variable in non-linear fashion depending upon said road friction representative data value.

6. An anti-rolling suspension control system as set forth in claim 2, wherein said road friction detecting means comprises a first wheel speed sensor for monitoring rotation speed of a driven wheel which is driven by an engine driving torque, a second wheel speed sensor for monitoring rotation speed of a non-driven wheel which is free from said engine driving torque, and means for deriving wheel slippage on the basis of outputs of said first and second wheel speed sensors.

7. An anti-rolling suspension control system as wet forth in claim 6, which further comprises a coefficient generating means receiving said rolling magnitude indicative data and the output of said wheel slippage derivation means for deriving a road friction dependent coefficient for modifying said rolling magnitude indicative date.

8. An anti-rolling control system for an automotive suspension system comprising:

a front suspension system disposed between a vehicular body and a suspension member rotatably supporting a front wheel, said front suspension system defining a working chamber filled with a working fluid having a variable fluid pressure within said working chamber for adjusting suspension characteristics;

a rear suspension system disposed between a vehicular body and a suspension member rotatably supporting a rear wheel, said suspension system defining a working chamber filled with a working fluid having a variable fluid pressure within aid working chamber for adjusting suspension characteristics;

first pressure control valve means associated with said working chamber of said front suspension system for controlling introduction and draining of working fluid into and from said working chamber for adjusting the fluid pressure therein;

second pressure control valve means associated with said working chamber of said rear suspension system for controlling introduction and draining of working fluid into and from said working chamber for adjusting the fluid pressure therein;

means for monitoring vehicular rolling magnitude for producing a rolling magnitude indicative signal;

means for deriving first and second control signals on the basis of said rolling magnitude indicative signal in order to control said first and second pressure control valve means for suppressing vehicular rolling, said control signal deriving means defining a variation range of said second control signal which is a smaller range than that of said first control signal, and providing a smaller gradient of variation for said second control signal than that of said first control signal.

9. An anti-rolling suspension control system as set forth in claim 8, which further comprises means for detecting road friction representative factor for producing a road friction representative data, and said control signal generating means being responsive to said road friction representative data for varying variation characteristics of said second control signal depending upon the value of said road friction representative data.

10. An anti-rolling suspension control system as set forth in claim 9, wherein said rolling magnitude monitoring means comprises a lateral acceleration sensor.

11. An anti-rolling suspension control system as set forth in claim 10, wherein said road friction detecting means comprises said lateral acceleration sensor.

12. An anti-rolling suspension control system as set forth in claim 11, wherein said control signal deriving means includes first amplifier for amplifying said rolling magnitude indicative signal with a first gain and a second amplifier amplifying said rolling magnitude indicative signal with a second gain which is smaller than said first gain.

13. An anti-rolling suspension control system as set forth in claim 10, wherein said road friction monitoring means comprises a first wheel speed sensor for monitoring rotation speed of a driven wheel which is driven by an engine driving torque, a second wheel speed sensor for monitoring rotation speed of a non-driven wheel which is free from said engine driving torque, and means for deriving wheel slippage on the basis of outputs of said first and second wheel speed sensors.

14. An anti-rolling suspension control system as set forth in claim 12, wherein said second amplifier has said second gain variable in non-linear fashion depending upon said road friction representative data value.

15. An anti-rolling suspension control system as set forth in claim 13, which further comprises a coefficient generating means receiving said rolling magnitude indicative data and the output of said wheel slippage derivation means for deriving a road friction dependent coefficient for modifying said rolling magnitude indicative data.

16. An anti-rolling control system for an automotive suspension system comprising:

a front suspension system disposed between a vehicular body and a suspension member rotatably supporting a front wheel, said front suspension system defining a working chamber filled with a working fluid having a variable fluid pressure within said working chamber for adjusting suspension characteristics;

a rear suspension system disposed between a vehicular body and a suspension member rotatably supporting a rear wheel, said suspension system defining a working chamber filled with a working fluid having a variable fluid pressure within said working chamber for adjusting suspension characteristics;

a rear suspension system disposed between a vehicular body and a suspension member rotatably supporting a rear wheel, said suspension system defining a working chamber filled with a working fluid having a variable fluid pressure within said working chamber for adjusting suspension characteristics;

first pressure control valve means associated with said working chamber of said front suspension system for controlling introduction and draining of working fluid into and from aid working chamber for adjusting the fluid pressure therein;

second pressure control valve means associated with said working chamber of said rear suspension system for controlling introduction and draining of working fluid into and from aid working chamber for adjusting the fluid pressure therein;

means for monitoring vehicular rolling magnitude for producing a rolling magnitude indicative signal;

means for monitoring road friction condition to produce a road friction data;

means for deriving first and second control signals on the basis of said rolling magnitude indicative signal in order to control said first and second pressure control valve means for suppressing vehicular rolling, said control signal deriving means defining a variation range of said second control signal which is a smaller range than that of said first control signal, and providing a smaller gradient of variation for said second control signal than that of said first control signal, which gradient of variation of said second control signal is variable depending upon said road friction data.

17. An anti-rolling suspension control system as set forth in claim 16, wherein said rolling magnitude monitoring means comprises a lateral acceleration sensor.

18. An anti-rolling suspension control system as set forth in claim 17, wherein said road friction monitoring means comprises said lateral acceleration sensor.

19. An anti-rolling suspension control system as set forth in claim 18, wherein said control signal deriving means includes first amplifier for amplifying said rolling magnitude indicative signal with a first gain and a second amplifier amplifying said rolling magnitude indicative signal with a second gain which is smaller than said first gain.

20. An anti-rolling suspension control system as set forth in claim 19, wherein said second amplifier has said second gain variable in non-linear fashion depending upon said road friction representative data value.

21. An anti-rolling suspension system as set forth in claim 18, which further comprises a coefficient generating means receiving said rolling magnitude indicative data and the output of said wheel slippage derivation means for deriving a road friction dependent coefficient for modifying said rolling magnitude indicative data.

22. An anti-rolling suspension control system as set forth in claim 17, wherein said road friction monitoring means comprises a first wheel speed sensor for monitoring rotation speed of a driven wheel which is driven by an engine driving torque, a second wheel speed sensor for monitoring rotation speed of a non-driven wheel which is free from said engine driving torque, and means for deriving wheel slippage on the basis of outputs of said first and second wheel speed sensors.

* * * * *